United States Patent [19]

Bicknell et al.

[11] Patent Number: 4,754,479
[45] Date of Patent: Jun. 28, 1988

[54] STATION NUMBER PORTABILITY

[75] Inventors: Rainie M. Bicknell, Westminster; Frank J. Bogart, Boulder; Henry C. Dittmer, Westminster, all of Colo.

[73] Assignees: American Telephone and Telegraph Company; AT&T Information Systems Inc., both of Holmdel, N.J.

[21] Appl. No.: 908,483

[22] Filed: Sep. 17, 1986

[51] Int. Cl.⁴ ........................ H04M 3/42; H04M 7/00
[52] U.S. Cl. .................................. 379/207; 379/211; 379/221
[58] Field of Search ............... 379/207, 225, 220, 221, 379/211

[56] References Cited

U.S. PATENT DOCUMENTS

| | | | |
|---|---|---|---|
| 4,284,852 | 8/1981 | Szybicki et al. | 379/221 |
| 4,310,727 | 1/1982 | Lawser | 379/207 |
| 4,313,035 | 1/1982 | Jordan et al. | 379/207 |
| 4,313,036 | 1/1982 | Jabara et al. | 379/207 |
| 4,348,554 | 9/1982 | Asmuth | 379/113 |
| 4,442,321 | 4/1984 | Stehman | 379/220 |
| 4,602,363 | 7/1986 | Das et al. | 370/58 |

FOREIGN PATENT DOCUMENTS 0174061  10/1984  Japan .................................. 379/207

OTHER PUBLICATIONS

"AXT121-A Digital Stored-Program-Controlled Exchange for Special Telecommunication Networks", T. Nilsson, *Ericsson Review* (Sweden), No. 4, 1984, pp. 186-196.

Primary Examiner—Thomas W. Brown
Attorney, Agent, or Firm—David Volejnicek

[57] ABSTRACT

An arrangement is disclosed for providing station number portability to stations ported from an original switching node to a new switching node which allows the ported station to maintain its original assigned station number. A ported station retains its original assigned number when it's original and new node have a common data base. The common data base identifies what station number is currently associated with which node. The station can be ported from one node to another node by altering the data base to indicate the new association of the ported number and the node to which the station has been ported.

15 Claims, 6 Drawing Sheets

FIG. 2

CALL PROGRESS TABLE

| CALLED STATION NUMBER | ASSOCIATED SWITCH IDENTITY | NETWORK NUMBERING PLAN INDICATION |
|---|---|---|
| 31234 | A | 0 |
| 443-1234 | A | 1 |
| 883-1234 | A | 2 |
| ... | ... | ... |
| 31235 | A | 0 |
| 443-1235 | A | 1 |
| 883-1235 | A | 2 |
| ... | ... | ... |
| 61234 | C | 0 |
| 445-1234 | C | 1 |
| 886-1234 | C | 2 |
| ... | ... | ... |

PORTABILITY CLUSTER SWITCHES

| SWITCH IDENTITY |
|---|
| A |
| B |
| C |
| ... |

NETWORK NUMBERING PLAN CONVERSIONS FOR INCOMING CALLS TO A PORTABILITY CLUSTER

| IDENTITY OF NETWORK NUMBERING PLAN INDICATION | COMMON NUMBERING PLAN CONVERSION FUNCTION |
|---|---|
| COMMON # (0) 3 | NO CONVERSION |
| PRIVATE # (1) 443 | 3 |
| PUBLIC # (2) 883 | 3 |
| ... | ... |
| PRIVATE # (1) 445 | 6 |
| PUBLIC # (2) 886 | 6 |

NETWORK NUMBERING PLAN CONVERSIONS FOR OUTGOING CALLS FROM A PORTABILITY CLUSTER

| IDENTITY OF NETWORK NUMBERING PLAN INDICATION | NUMBERING PLAN CONVERSION FUNCTION |
|---|---|
| COMMON # (0) 3XXXX | NO CONVERSION |
| PRIVATE # (1) 3XXXX | 443 |
| PUBLIC # (2) 3XXXX | 883 |
| ... | ... |
| PRIVATE # (1) 6XXXX | 445 |
| PUBLIC # (2) 6XXXX | 886 |

COMMON DATA BASE FOR STATION NUMBER PORTABILITY

| CALLED STATION NUMBER | ASSOCIATED SWITCH IDENTITY |
|---|---|
| 31234 | A |
| 31235 | B |
| 61234 | C |
| ... | ... |

ROUTE SELECTION AT SWITCH A

| DESTINATION SWITCH IDENTITY | PATH DESTINATION | ALTERNATE PATH DESTINATION |
|---|---|---|
| A | — | — |
| B | X | Z |
| C | Z | X |
| ... | ... | ... |

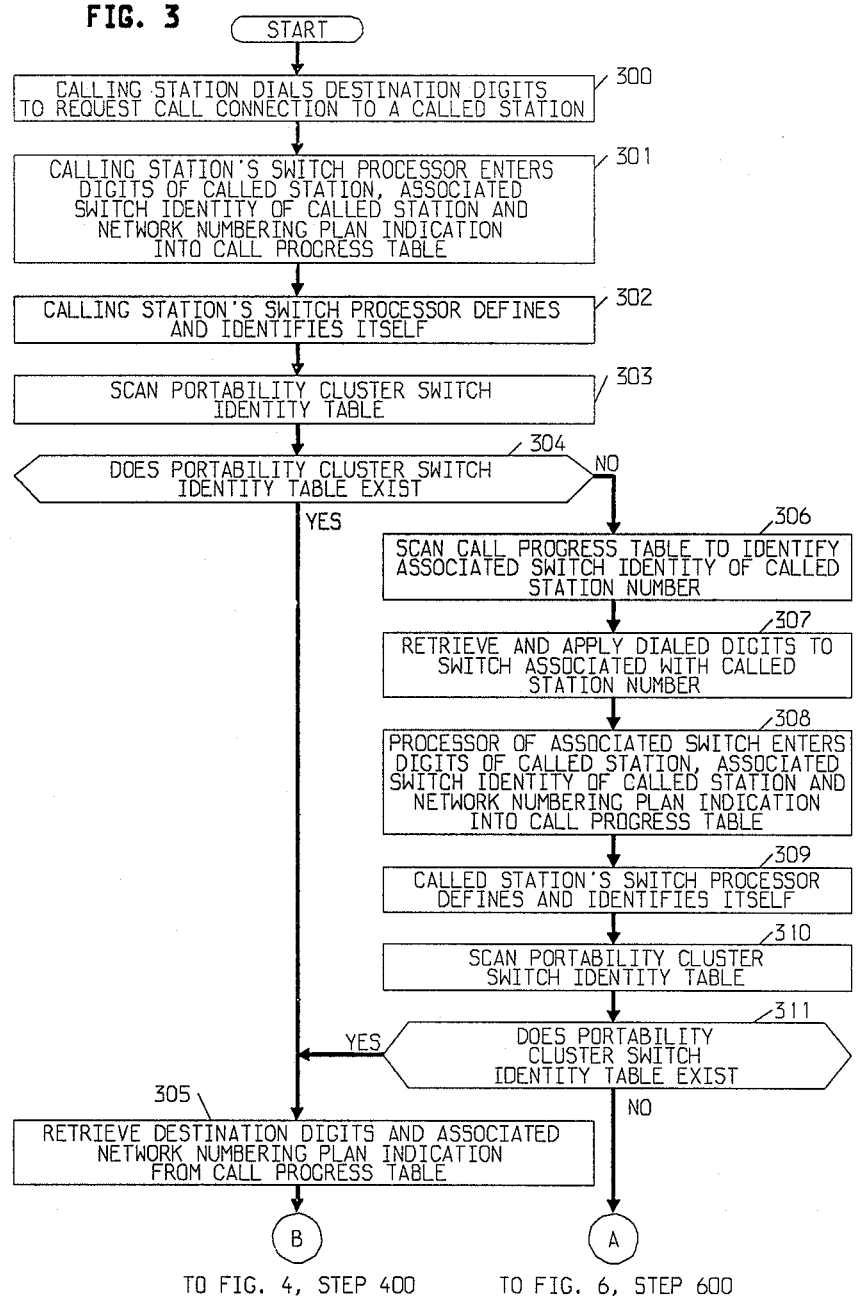

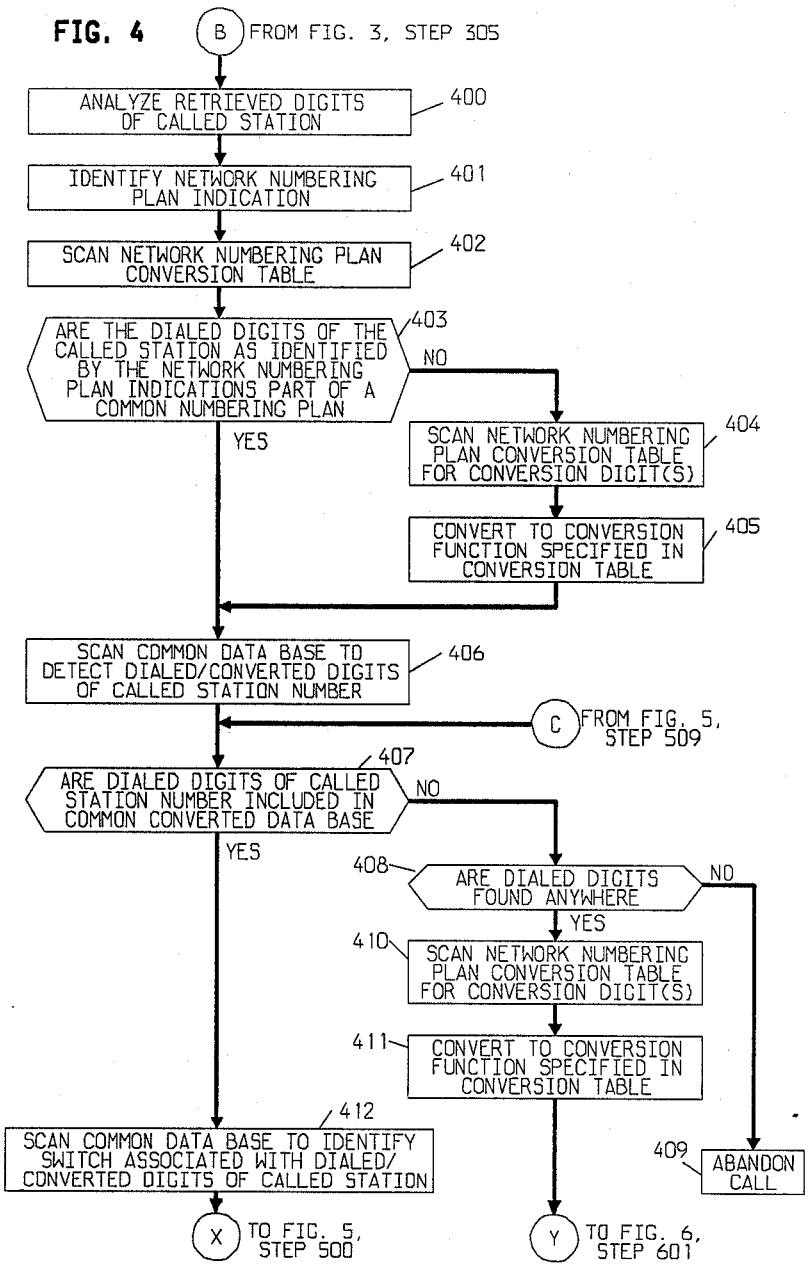

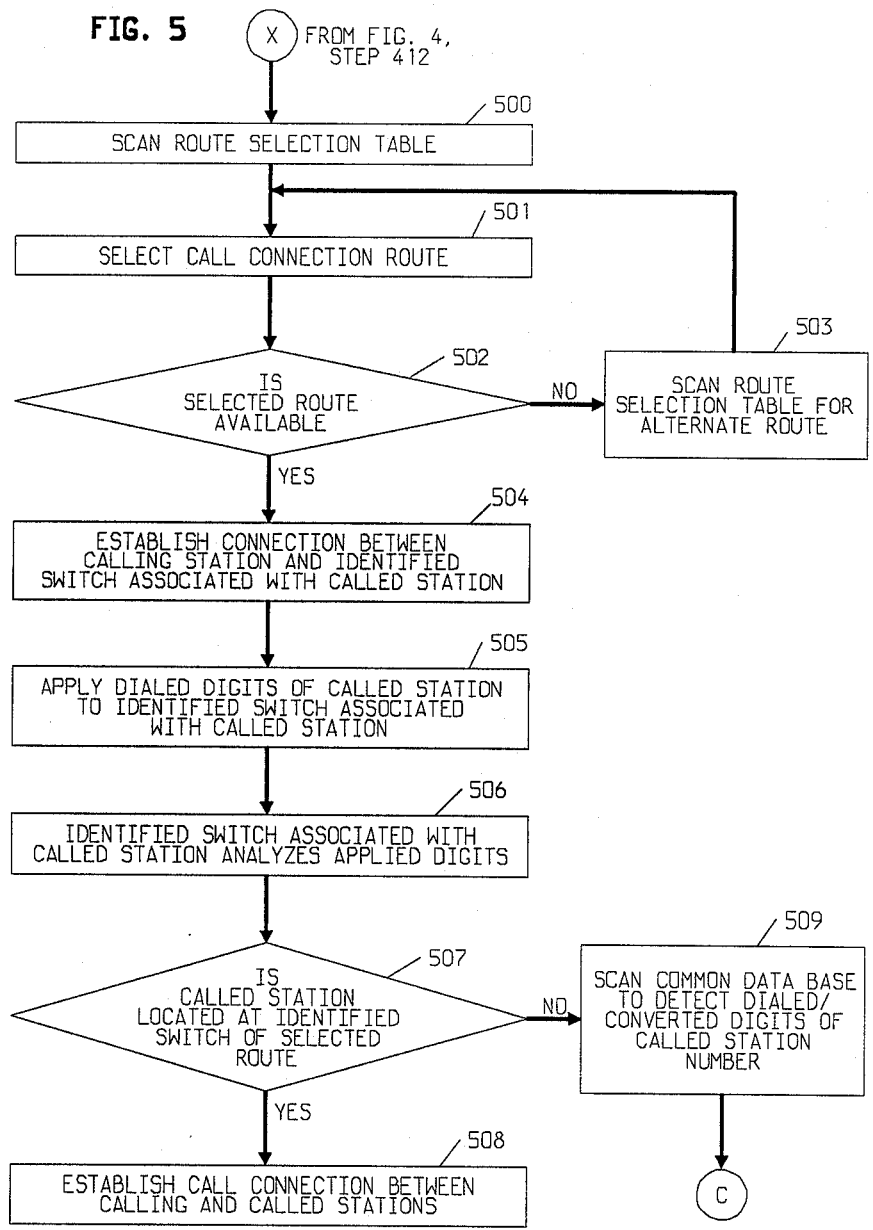

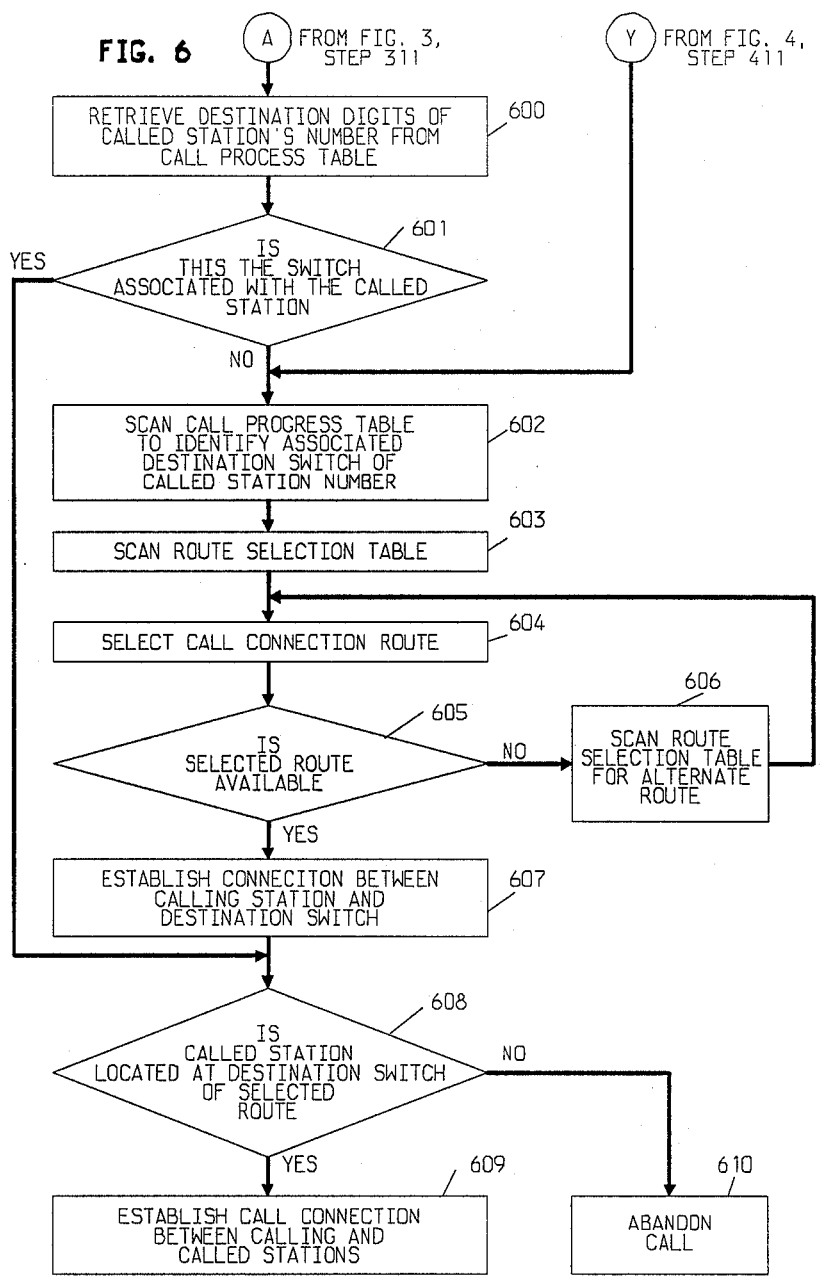

STATION NUMBER PORTABILITY

TECHNICAL FIELD

This invention relates to communication switching networks, and, in particular, to an arrangement for providing station number portability to stations ported from an original switching node to a new switching node. This allows a station to maintain its original assigned station number regardless of station relocation.

PROBLEM

Communication switching networks, both private and public, comprise a plurality of switching nodes. Tie trunks interconnect the switches of a private network and central office (C.O.) trunks connect the switches of a public network. Each switch serves a number of connected station devices such as telephones, terminals, and personal computers (PCs). To establish a connection between a calling and called station, a calling party dials the station number of the called station. The dialed station number identifies the location of the called station to a particular switch, as defined by a specific numbering plan. A numbering plan uniquely identifies each switch and station according to the dialed number. Each switch recognizes the dialed number, and establishes a call connection between the calling and called stations following the recognition of the sequence.

Many different numbering plans are utilized in private and public networks. These include 4-, 5-, 7- and 10-digit plans. For example, in a 7-digit private numbering plan, the called number 443-1234 identifies a switch having a 443 identity. Switch 443 locates the called station by identifying station equipment 1234 and establishing a connection to the called station. Private switch 443 may also be associated with a unique prefix associated with a public network numbering plan, such as 883-1234. The same switch can recognize a private and public prefix to process a call connection.

As communication needs expand and society becomes increasingly mobile, it is likely that station users will be transplanted, at least once, from an original switch to a new switch. The problem associated with transplanted station users is that the users must be assigned new station numbers because, as previously described, each switch is associated with a unique numbering sequence according to a specified numbering plan which prevents a receiving switch from processing called numbers that do not include the unique numbering sequence. New number assignments are disadvantageous to many subscribers, especially business subscribers.

A possible solution to the above-described problem may be to utilize permanent "call forwarding". One problem with call forwarding is that if a station user is transplanted more than once, a string of call forwarding numbers for that one user could result. Administration of a call forwarding operation for a string of numbers is cumbersome for a communication system, since it requires a substantial amount of processing time. Additionally, the establishment of a call connection can be delayed during the execution of call forwarding processing operations. Another problem with call forwarding is that two numbers are taken out of circulation, the station user's original assigned number and the call forward number. The original and call forward numbers are not reassignable since the original number is used to locate the call forward number, and the call forward number is used to establish the call connection to the called party. The call forward number is applied to the switch serving the called station to establish the call connection. This arrangement limits the availability of assignable station numbers.

Therefore, it would be advantageous to provide an arrangement which allows a station user to keep his/her original assigned number despite physical relocation from an original switch to a new switch without utilizing the above-described call forwarding arrangement.

SOLUTION

A solution to the above-described problem and a technical advance in the field is achieved by providing a station number portability arrangement. This arrangement allows a subscriber who is ported from an original switch to a new switch to retain his/her originally-assigned number regardless of any numbering plan constraints.

The disclosed arrangement includes a plurality of switches termed portability cluster. All switches of the portability cluster contain a common data base. The common data base identifies what station number is currently associated with which switch of the cluster. A station can be ported from one switch to another switch of the same cluster by altering the data base in each switch to indicate the new association of the ported number and the switch to which the station has been ported.

Assume, for example, that a calling station resides on switch A, that a called station has been ported from switch A to switch B, and that both A and B are included in the portability cluster. Assume further, for ease of description, that both switches, A and B, are part of a 5-digit numbering plan. A calling party dials the original assigned 5-digit number, e.g., 51234, of the called station. In response to the receipt of the dialed number, a switch processor of switch A scans its common data base to determine which switch is associated with that dialed number. The common data base indicates that 51234 now resides on switch B. Following the determination, the original assigned number of 51234 is transmitted from switch A to switch B. Switch B scans its common data base to confirm that the called station number 51234 resides on B. A call connection is then established following the common data base verification. In this manner, a station user retains his/her original assigned number despite relocation to a new switch. Each switch of the portability cluster recognizes all valid incoming numbers regardless of any numbering plan identities, and therefore, a call connection between a calling and a ported called station is handled by any switch included in the portability cluster. The original station number does not require translation to a different number so that the new switch can process the call. This allows the station user to retain his/her original assigned number.

The above-described station number portability arrangement eliminates the need to provide new station number assignments, maintains continuity of contact between the station user and his/her communication needs, provides transparency, and allows a subscriber to expand with his/her communication needs.

BRIEF DESCRIPTION OF THE DRAWINGS

These and other advantages of the invention may be better understood from a reading of the following description of one possible exemplary embodiment taken in conjunction with the drawings in which:

FIG. 2 illustrates the memory structure of the tables utilized in the station number portability arrangement; and FIGS. 3, 4, 5 and 6 illustrate in flow chart form the steps required to implement the station number portability arrangement.

DETAILED DESCRIPTION

Private and Public Switching Networks

Figure 1:
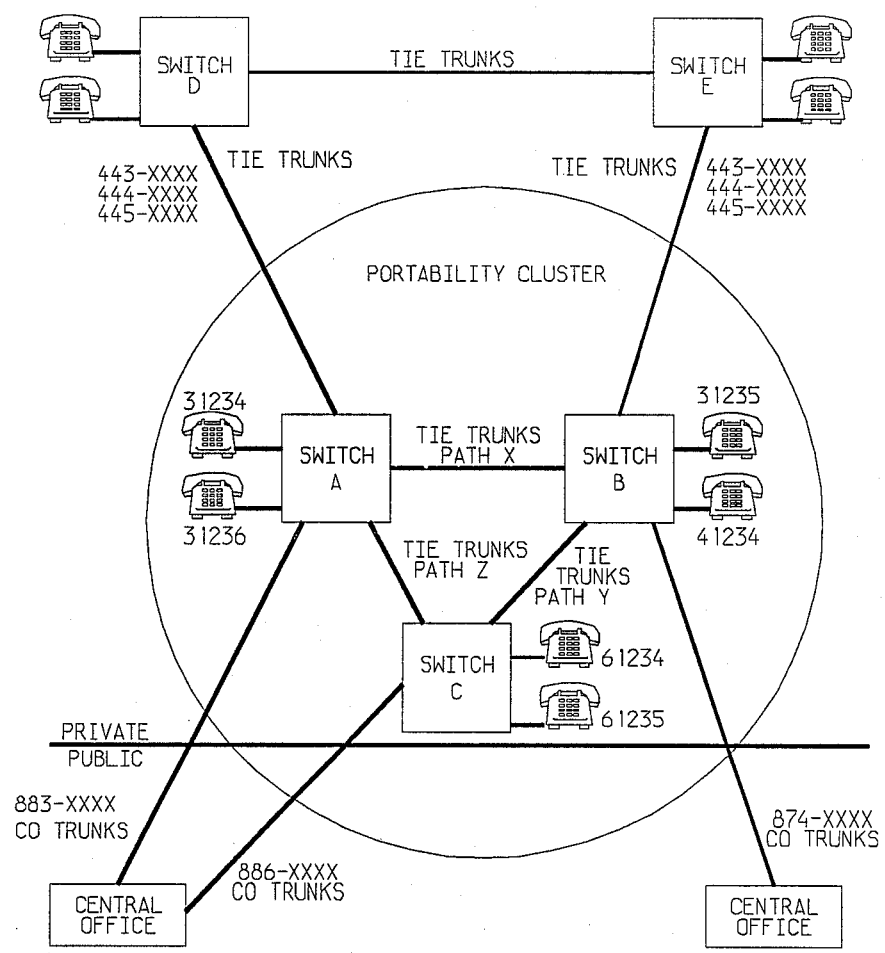
FIG. 1 illustrates a communication switching network arrangement comprising different types of numbering plans.

FIG. 1 illustrates a private switching network comprising switching nodes A through E. These switching nodes may be Private Branch Exchanges (PBXs). Each switch serves a plurality of stations such as telephones, terminals and personal computers (PCs). For ease of description, assume that stations refer to the telephones illustrated in FIG. 1 and that the switches are PBXs. Each switch interconnects to other switches via tie trunks. A private switching network is typically utilized by a large corporation. The bold solid line labeled private/public in FIG. 1 indicates that the private network exists above the line in FIG. 1.

FIG. 1 also illustrates a portion of a public network as shown below the bold solid line. The public switching network typically comprises a number of central offices (C.O.s) which connect to a plurality of PBXs via C.O. trunks. The C.O. facilities are used for establishing toll calls between calling and called stations when either the calling or called station exists outside the private network. The PBXs do not have to directly connect to the C.O. facilities to place calls through or receive calls from the public network. A call connection to the C.O. facilities can tandem through one or more PBXs to provide C.O. connectivity. Tandeming is known to the art and is, therefore, not explained in further detail. The C.O.s illustrated in FIG. 1 provide switching nodes A through E access to and from a public toll network such as the DID (direct inward dialing) network.

Network Numbering Plans

Each network utilizes numbering plan(s) to uniquely identify each switching node. Each switch recognizes its numbering plan identity and establishes call connections to called stations in response to the digits associated with its numbering plan identity. If the digits received do not match the numbering plan identity of a particular switch, then the switch will not handle the call. A numbering plan may be of a 4-, 5-, 7-, or 10-digit type, where a specified grouping of digits in a particular dialed sequence uniquely identifies a particular one of the switches included in a network. A switch can have several numbering plan identities, depending on which numbering plan a calling station uses to reach a called station.

Assume, for example, the calling party resides outside the private network and wishes to reach a called station, such as station 31234, in the private network. Station 31234 resides on switch A, as illustrated in FIG. 1. The calling party dials a 7-digit number, 883-1234 as defined by the public network numbering plan. The prefix 883 identifies switch A. Switch A, therefore, recognizes the 883 exchange and processes the call to establish a connection between the calling station and station 31234. Assume, now, that a calling party resides on switch D of the private network and wishes to reach called station 31234 residing on switch A. The calling party dials a 7-digit number, 443-1234 as defined by the private network numbering plan. The prefix 443 also identifies switch A. Switch A recognizes the 443 exchange and processes the call to establish a connection between the calling station and station 31234. With respect to the above-described cases, switch A is identified by a set of digits associated with the private and public numbering plans. Switch A recognizes both numbering plan identities and can process calls in response to dialed called numbers from either network.

Additionally, a private network may include a subset of switches which subscribe to a 5-digit numbering plan. This subset arrangement is often utilized for a group of PBXs in close physical proximity, such as buildings located across the street from one another. Switches A, B, and C of FIG. 1 are an example of such a subset arrangement utilizing a 5-digit numbering plan. Assume a calling party resides at switch C; the calling party merely dials 31234 as defined by the 5-digit numbering plan. The prefix 3 identifies switch A. Switch A, therefore, recognizes the 3 and processes the call to establish a connection between the calling station and station 31234. As described with respect to the above-discussed examples, switch A is identified by three numbering plans identities. Switch A recognizes the dialed numbers, 883-1234, 443-1234 and 31234, since each number includes its numbering plan identity. The numbering plan specifies a unique set of digits which are associated with a particular switch. A switch recognizes its unique set of digits and processes calls in response to the receipt of the unique digits to establish a call connection to the called station which resides on it. However, if a switch receives a digit string which does not include its numbering plan identity, the receiving switch cannot process a call connection since it does not recognize the called number. For example, if a calling party from the public network dialed 889-1234 to reach called station 31234, switch A would not recognize the called number, since its numbering plan identity is 883 rather than 889. Switch A would not respond to the receipt of 889-1234 to establish a call connection. Therefore, each switch handles only those called numbers it recognizes as defined by a numbering plan identity. Unrecognizable numbers remain unprocessed.

Portability Cluster

The number portability arrangement overcomes dependency on numbering plan identities and allows a switch to process calls regardless of whether the dialed number received by a switch includes the unique numbering plan identity for that switch. Disregarding numbering plan identity allows station number portability, i.e., a station maintains its original assigned number despite relocation from an original switch to a new switch. To provide station number portability, the original and new switch must be included in a portability cluster. A portability cluster comprises switches having a common data base which identifies what station number is currently associated with which switch. A station can be ported from an original switch to a new switch by altering the data base to indicate the new association of the ported number with the new switch. Therefore, a calling party merely dials a called station's original assigned number to reach that called station on any switch included in the portability cluster, since the common data base serves to associate the dialed called number with a particular switch. The details of the common data base are discussed subsequently.

FIG. 1 illustrates that the portability cluster comprises switches A, B and C, respectively. As previously described, these switches also comprise a subset of the private network which subscribes to the 5-digit numbering plan. The portability cluster may include any or all of the switches shown in FIG. 1, regardless of which network includes the switch. A portability cluster may comprise an entire network, or include an entire geographic area of networks such as the communication networks comprising the United States. The concept of station number portability can be geographically extended to include every switch comprising every switching network in the United States. The current limitations for implementation may be insufficient memory and prohibitive costs. However, as memory becomes cheaper and more memory becomes available, an entire geographic region may be enveloped into the portability cluster. This would allow station users to be geographically relocated over long distance and still retain the station's original assigned number.

For example, assume a station user is ported from a Colorado switch to a California switch. Assume further that a station's original assigned number is 303-555-1212. With a station number portability option, a calling party merely dials the original assigned number 303-555-1212 and the call is established between the calling party and the California switch identified in the common data base that is associated with the dialed called number. An extensive common data base listing station number and switch associations would be required. However, such a common data base would not be unwieldy if space and economic constraints were removed. But for ease of description, assume the portability cluster arrangement of FIG. 1.

A portability cluster utilizes a common numbering plan structure by which to locate a called number. Therefore, all called numbers either in the common number plan format, or are converted to the common numbering plan format, described subsequently, when the called number is processed by a switch included in the portability cluster. The common numbering plan format may be of the 4-, 5-, 7-, or 10- digit type depending on an administrator's preference. For ease of description, assume that the 5-digit numbering plan serves as the common numbering plan. The common numbering plan is discussed in more detail subsequently. Only those switches comprising the portability cluster can offer station number portability. Any station which relocates to a switch outside of the portability cluster cannot retain its original station number, because the switch outside the cluster does not include the common data base which associates a called number with a particular switch.

Assume the following: switch A typically serves stations having station numbers beginning with 3, switch B typically serves stations having station numbers beginning with 4, and switch C typically serves stations having station numbers beginning with 6, according to a 5-digit numbering plan. Assume further that the private and public network 7-digit numbering plan identities, as previously described, are as shown in FIG. 1. Switches A, B, and C are interconnected via tie trunks X, Y and Z. Switches A, B, and C connect to C.O. facilities via C.O. trunks, and to PBX's, D and E, via tie trunks. Assume further that station 31235 has been ported from switch A to switch B. Prior to discussing the implementation of station number portability, with respect to ported station 31235, the following discussion describes the memory structure of the switches included in the portability structure. The memory structure provides each switch with the capability to administer the station number portability feature.

Memory Structure for Station Number Portability

FIG. 2 illustrates in tabular representation the memory structure of each switch included in the portability cluster. The memory structure comprises a call progress table, a portability cluster switch identity table, a network numbering plan conversion table for incoming calls, a network numbering plan conversion table for outgoing calls, a common data base for station number portability table, and a route selection table. These tables are stored in a main memory (not shown) of a processor (not shown) of each switch. The information comprising the tables is utilized during the establishment of a call connection between a calling and called station. The establishment of a call connection is discussed subsequently.

The following description discusses the function of each table illustrated in FIG. 2. Assume that the tables shown are the tables stored in the main memory of switch A. Each switch has substantially similar tables with like functions, but for ease of description, only the structure of switch A is discussed. The call progress table indicates a current status of a call connection. Although more entries may be shown, such as a busy/idle indication, for the purposes of this invention only those entries which comprise a portion of the present invention are shown. In particular, the call progress table includes the number of the called station, the identity of the switch associated with the called number as specified by the dialed digits associated with a particular numbering plan, and an indication of which numbering plan was used to access the called station. A 0 indication specifies that a common numbering plan number was used, a 1 indication specifies that a private numbering plan number was used, and a 2 indication specifies that a public numbering plan number was used. For example, to reach station 31234 residing on switch A, a calling party within the common network numbering plan dials a 5-digit number, i.e., 31234. A calling party within the private network dials 443-1234, and a calling party within the public network dials 883-1234. Each calling party reaches 31234 on switch A, but utilizes a different numbering plan number. The call progress table of FIG. 2 illustrates further examples. With respect to station 31235, the numbering plan dialed number indicates that 31235 resides on switch A. The call progress table does not indicate ported status, i.e., station 31235 now resides on switch B, but only indicates the identity of the original switch as identified by the dialed network numbering plan number.

The network numbering plan conversion tables for incoming and outgoing calls, respectively, provide the appropriate conversion function for converting a called number to or from a common numbering plan to establish a call connection. As previously described, the portability arrangement utilizes a common numbering plan by which to identify the called number, and therefore, provides a conversion function when necessary to standardize all called station numbers according to a common numbering plan utilized in the portability cluster. Therefore, all incoming called numbers to the portability network from the private network are converted such that the first 3 dialed digits, 443, are converted to 3, and all incoming called numbers from the public network are converted such that the first 3 dialed digits, 883, are also converted to a 3. The administration of call connections within the portability cluster is based on a 5-digit dialing plan. In cases of outgoing calls from the portability cluster to other networks utilizing other than a 5-digit numbering plan, a dialed 5-digit number is converted to a number associated with the numbering plan appropriate to complete the call connection. Therefore, for example, a dialed 3xxxx number converts to a 443-xxxx number for private network calls, and a dialed 3xxxx converts to a 883-xxxx number for public network calls. This conversion function is necessary since calls may be required to route through networks not subscribing to the common numbering plan. The conversion tables are discussed in more detail subsequently.

The portability cluster switch identity table identifies each of the switching nodes included in the portability cluster. As previously discussed, only the switches included in the portability cluster provide station number portability. The table illustrates that switches A, B, and C comprise the portability cluster.

The common data base for station number portability table comprises a list of called station numbers and the switches associated with each listed called number. As previously described, the common data base utilizes a common numbering plan to more efficiently administer the portability feature. Therefore, with respect to the present example, if a called number is not a 5-digit number, then it is converted to a 5-digit number. This conversion, however, does not change the dialed called number to a different number as is the case in call forwarding. The converted number is effectively the original dialed number as represented in a common numbering plan format. The conversion to a common numbering plan format is described subsequently. The common data base comprises a list of called numbers conforming to the common numbering plan format. Each 5-digit called number is associated with a portability cluster switch. For example, as the station number portability table illustrates, station 31234 resides on switch A, 31235 resides on switch B, and 61234 resides on switch C. The called station number and its associated switch is independent of any numbering plan number identities. For example, as previously described, 31235 according to the numbering plan identity should reside on switch A as shown in the call progress table of FIG. 2, because switch A typically serves all 5-digit station numbers beginning with a 3. However, the number portability arrangement does not rely on a dialed number to identify a particular switch by a unique numbering plan number. Each called number is directly associated with a specified switch regardless of any numbering plan identities. In the present example, the called number, 31235, is associated with switch B. Switch B does not typically serve station numbers beginning with 3, but the common data base allows switch B to recognize 31235 and handle the call connection.

The route selection table identifies the path(s) over which call connections are established between a calling station and an identified switch. Route selection tables are typically included in all switches regardless of portability status. Therefore, since route selection is known to the art, the actual process of route selection and connection is not described in great detail, except where necessary to explain station number portability. Following a determination that a station has been ported from an original switch to a new switch, the route selection table specifies the appropriate trunk over which to establish a call connection. With respect to the present example, since station 31235 was ported from switch A to switch B, the route selection table at switch A appears as shown in FIG. 2. Each switch has a similar route selection table, but with entries appropriate for routing between different ones of the switches. But for ease of description, assume routing from switch A. To route the call connection to the switch specified by the common data base of switch A, the route selection table of switch A specifies path X (see FIG. 1), and if path X is not available, i.e., the trunk is busy, then the call connection is made over alternate path Z to switch C. Switch C serves as a tandem switch and tandems the call connection to switch B over path Y. The call connection is then established between the calling station and the ported called station.

FIG. 2 illustrates the memory structure for each switch included in the portability cluster. The nonportability switches have a memory structure that includes only the call progress table and a route selection table particular to the switches' call establishment operations. The remaining tables are particular to portability switches and their call establishment operations. The tables of FIG. 2 are discussed in more detail subsequently with respect to the flow charts illustrated in FIGS. 3 through 6.

Implementation of Station Number Portability

FIGS. 3 through 6 illustrate in flow chart form the steps required to implement station number portability. The following three scenarios are subsequently described where appropriate: first a calling station, such as station 31234 which resides on switch A, dials called station number 31235; second a calling station, such as a station which resides on switch D of the private network, dials called station number 443-1235; and third a calling station, such as a station which resides in the public network, dials called station number 883-1235. See FIG. 1 to identify the specified locations of the calling station. As previously described, assume station 31235 resides on a portability cluster switch unless otherwise indicated.

FIG. 3 illustrates steps 300 through 311 which identify the steps required to establish a call connection between a calling and a called station where the station number portability feature is available. All other call connection processing operations are known to the art and are not discussed in detail except where pertinent to the portability implementation disclosure. The identified processing steps are performed in a processor (not shown) of a switching node that is included in the portability cluster. All other switching nodes provide typical call connection processing operations which are known to the art.

To make a call, a calling station such as 31234 goes off-hook and receives dial tone from its associated switch, A. Following receipt of dial tone, the calling party at station 31234 residing on switch A dials the number of the called station, i.e., 31235, step 300. The process of exchanging signaling information between a switching node and a calling station is known to the art and is, therefore, not described in detail. In response to the dialed digits of 31235, switch A, at step 301, enters the called number, the switch associated with the called number as dictated by the network numbering plan, and an associated network numbering plan indication, into its call progress table. The call progress table was previously discussed with respect to FIG. 2. As previously described, interportability calls utilize a common numbering plan such that the calling party merely dials a 5-digit number to reach a called party. Therefore, as FIG. 2 illustrates, the entries in the call progress table are 31235, A, and 0, respectively, when the calling station is residing in the portability cluster. However, if the calling station resides outside the portability cluster, i.e., in the private or public network, the entries would be 443-1235, A and 1, and 883-1235, A and 2, respectively, for the called station 31235. The call progress table of FIG. 2, therefore, illustrates a call to the same station, i.e., 31235, but utilizing different numbering plan identity station numbers.

Following the entry of the call progress information into the call progress table at step 301, the switch associated with the calling station identifies, at step 302, itself. If the calling station is 31234, the switch associated with the calling station is A (see FIG. 1). With respect to the calling stations which dialed the 443-1235 and 883-1235 numbers, the calling station obviously resides on a switch outside the portability cluster. The calling station may reside on switch D or may reside in the public network. Each switch either within the portability cluster or outside the portability cluster identifies itself or knows its identity Following a determination as to the identity of the calling station's switch processing advances to step 303. If the switch associated with the calling station is included in the portability cluster, such as 31234 on switch A, the processor scans, at step 304, for its portability cluster switch identity table as shown in FIG. 2. If the table exists, indicating that the switch is a protability switch, processing advances to step 305, discussed subsequently.

However, if the calling station resides on a switch outside the portability cluster, as is the case in scenarios two and three, the processor does not detect that a portability cluster switch identity table exists in its main memory at step 304. This indicates that the switch of the calling station is not included in the portability cluster, and processing advances to step 306. The switch associated with the calling station cannot offer the portability feature nor can it detect whether a called station has been ported.

The processor of the switch associated with the calling station scans, at step 306, its call progress table to identify the switch associated with the called station number as provided by the numbering plan. As previously described, the dialed digit groupings identify switch A as the switch associated with 443-1235 and 883-1235. Following the identification of the switch based on the numbering plan number, the called number is retrieved from the call progress table of the switch associated with the called station, at step 307, and the digits of the called number are transmitted to the destination switch indicated in the call progress table. In response to the receipt of the digits, a processor of the destination switch associated with the called station enters the called number, the switch associated with the called number, and its network numbering plan indication, into its own call progress table at step 308. This process has been previously described and will not be described in detail. However, assume the call progress table of the called switch is similar to the call progress table illustrated in FIG. 2, for ease of description.

Following the entry of the above-described information into the call progress table, the processor of the switch associated with the called station identifies itself at step 309 in the same manner as did the switch of the calling station. At step 310, the processor scans for a portability cluster table. The processor determines, at step 311, whether the portability cluster switch table exists in its main memory. As previously described with respect to a positive response to step 304, if the switch of the called station is included in the portability cluster, the portability cluster table will exist in its main memory and the processing advances to step 305. Step 311 is similarly executed for the switch of the called station. Again, this indicates that the switch of the called station can provide the station number portability feature and can identify the location of a ported called station. Therefore, if the switch of the calling station or the switch of the called station is included in the portability cluster, then the station number portability feature can be implemented to try and locate a ported station. Assume, briefly, that switch A is not included in the portability cluster. If, at step 311, the switch of the called station is not included in the portability cluster, normal call processing operations occur to establish a call connection. As previously described, a call connection to called number is based on a numbering plan number, and therefore, if a station has been ported, an original assigned number cannot be used to establish a call connection. Assume processing advances to point A of FIG. 6, since neither the calling switch nor the called switch are included in the portability cluster.

The switch processor of the switch associated with the called station retrieves the dialed station number from its call progress table at step 600. At step 601, the switch processor verifies that it is the switch that is identified as the switch associated with the called station number as defined by the numbering plan number. Therefore, the dialed numbers of 443-1235, 883-1235, and 31235 indicate that according to the numbering plan, the called station resides on switch A. Following the retrieval and verification, switch A analyzes the dialed digits of the called number to determine the equipment location of the called station and processing advances to step 608. Steps 602 through 607 are discussed subsequently.

The switch processor of the switch associated with the called station, i.e., the destination switch, determines whether or not the called station is physically located on it. If the called station has not moved, processing advances to step 609 and a call connection between the calling and called station is established. Typical call processing operations take over. These processing operations are known to the art and, therefore, are not described in detail. However, if the station has moved such that the called station is not physically located on the destination switch, switch A cannot process the call, and processing advances to step 610 where the call is abandoned. The call is abandoned since the destination switch is not physically connected to the called station as based on the network numbering plan, and therefore, the switch is unable to complete the call connection. The above discussion assumes that neither the switch of the calling station nor the switch of the called station are included in the portability cluster. The following discussion assumes that either the originating or destination switch is included in the portability cluster, and therefore, the station number portability feature is available to stations associated with these switches. In either case, the processing operation is similarly executed in either switch; it merely is dependent on whether one or both switches are portability switches.

As previously described, if either switch is included in the portability cluster, processing advances to step 305 of FIG. 3. At step 305, the switch, either the originating or destination switch (hereinafter, generically called the portability switch) as determined by the numbering plan, retrieves the dialed digits and the associated network numbering plan indication from the call progress table of FIG. 2. Processing then advances to point B of FIG. 4. At step 400, the processor of the portability switch analyzes the retrieved digits and, concurrently, at step 401, identifies the numbering plan indication associated with the called station number.

In response to the identity of the network numbering plan indication, the portability processor scans, at step 402, the network numbering plan conversion tables of FIG. 2 to determine if a conversion is required for station number portability implementation. As previously described, station number portability is based on a common numbering plan, and therefore, if the incoming called number does not conform to the common numbering plan format, then a conversion is required. Assume the first scenario where the called number is 31235. With respect to the incoming called number of 31235, the portability processor scans, at step 403, the network numbering plan conversion table for incoming calls (see FIG. 2). Since a 5-digit number, 31235, has been dialed, the called number conforms to the common numbering plan format as indicated by the 0 indication in the call progress table. In response to the 0 indication, the network numbering plan conversion table indicates no conversion is necessary. Therefore, processing advances from step 403 to step 406. Step 406 is discussed subsequently.

However, if the called number does not conform to the common numbering plan format, i.e., it is a private or public network number, i.e., 443-1235 or 883-1235, the dialed number is converted to the common numbering plan by deleting the first three digits and appending the appropriate common numbering plan digit, i.e., a 3, as processing steps 404 and 405 indicate. (See network numbering plan conversion table of FIG. 2). Processing then continues to step 406.

As previously described, if the called station resides outside the portability cluster and the calling station resides within the portability cluster, the network numbering plan conversion table for outgoing calls provides the appropriate conversion functions so as to allow the call to route properly through the private or public network. For example, with respect to a private network call, a 443 is appended to the dialed number; and with respect to a public network call, a 883 is appended to the dialed number. However, our current example only deals with incoming calls to a portability switch. The conversion would be required if the call connection required tandem routing through either the private or public network. However, these types of calls are not discussed since it would unduly complicate the portability description. Assume, hereinafter, only incoming calls.

Following the implementation of the appropriate conversion function, when necessary, processing advances to step 406. At step 406, the portability switch processor scans the common data base table of FIG. 2 to determine which switch is associated with the dialed called station number irrespective of a numbering plan indication. In particular, the portability processor determines, at step 407, if the called number is included in the common data base. The called number entries in the common data base associate a particular called station number to a specific switch. If the called station number is included in the common data base, processing advances to step 412. Step 412 is discussed subsequently.

Assume, however, that the called station number is not found in the common data base. This indicates that, for some reason, e.g., administrator programming failure or processing error, the location of the called number is undefined. Processing, in response to the above condition, advances to step 408. The portability processor scans its entire memory structure to determine if the called number is found anywhere. If the called number is not found anywhere so as to locate the called station to a particular switch, the call is abandoned at step 409. The calling party must place the call again.

However, if the called number, at step 408, is found somewhere in the processor's memory structure, which may include numbering plan routing information or call forwarding information, processing advances to step 410. This indicates that the called station number is located at a particular switch according to a numbering plan identity rather than a switch identity and that the called station probably resides outside the portability cluster. The portability processor performs a scanning function of the network numbering plan conversion table at step 410, and then a conversion function at step 411, to convert the station number into the appropriate numbering plan format. This process was previously described with respect to steps 404 and 405, respectively, and therefore, is not described in detail here. Following the scanning and conversion process, processing advances to Y of FIG. 6.

At step 602, the portability processor scans its call progress table to identify the destination switch associated with the converted called number as determined by the network numbering plan number. The destination switch exists outside the portability cluster. Following identification of the destination switch, the portability processor scans its route selection table to identify the path over which to establish a call connection, at step 603. At step 604, the processor selects a route. If the selected route is available, i.e., the trunk is idle, processing advances to step 607. However, if the selected route is unavailable, i.e., the trunk is busy, processing advances to step 606 for selection of an alternate route. Steps 604 through 606 are repeated until such time as a route becomes available, and then processing advances to step 607. A call connection is established between the calling station and the destination switch identified by the numbering plan number. At the destination switch, as previously described with respect to steps 608 through 610, a determination is made and the proper processing occurs, depending on whether the called station is located at the destination switch. No further detail is disclosed, since these steps were previously described. The above describes the case where the station number is not included in the common data base. The remaining discussion assumes that the number is included in the common data base and indicates that the called station has been ported from an original to a new switch.

Assume now that the station number, as converted or as originally dialed, is included in the common data base as determined in steps 406 and 407, respectively, of FIG. 4, and processing continues to step 412. At step 412, the portability processor scans the common data base table to identify the switch associated with the dialed called station number. Processing then advances to X of FIG. 5. Following a determination of which switch is the switch associated with the called station number, the portability processor scans the route selection table of FIG. 2 to determine a prescribed route to establish a call connection between the calling station and the switch specified by the common data base table. The called station 31235 now resides on switch B, and therefore, an incoming call to switch A or a call from switch A requires routing to switch B in order to reach the called party. As previously described, the portability processor scans, at step 500, a route selection table to select an appropriate call connection route. At step 501, the portability processor selects the call connection route specified in the route selection table. At step 502, the switch processor determines if the selected route is available. If the selected route is not available, processing continues to step 503 to determine if an alternate route is specified. Steps 501 through 503 are repeated until a route becomes available. The route selections from switch A to switch B were previously described with respect to the description of the route selection table in FIG. 2. Assume that a route, i.e., an idle trunk, exists as determined at step 502.

Processing advances to step 504 in response to an available route. The portability processor establishes a connection between the calling station and the switch associated with the called station as specified by the common data base. As FIG. 2 illustrates, 31235 with respect to the numbering plan number resides on A, but as the common data base indicates, the called station number now resides on switch B since it has been ported. At step 505, the portability processor of A transmits the dialed called number to the switch associated with the called station number, switch B. The portability processor of switch B (assume portability identification has occurred), at step 506 and 507, analyzes the digits to determine if the called station is physically located on it. The called station may not be located at the identified switch for two reasons: one, the station has been ported to another switch outside the cluster; or two, an alternate route was used so that the call connection is established through a tandem portability switch. If the called station resides on the destination switch of the selected route, processing advances to step 508 and a call connection between the calling and called stations is established. However, if, at step 507, the called station is not located at the destination switch of the selected route, then the portability processor scans its common data base, at step 509, to determine the switch associated with the transmitted called station number. To determine the location of the called station, processing advances to point C of FIG. 4. Steps 407 through 412 were previously discussed, and therefore, require no further detail. The repetition of these steps indicate that the switch of the selected route is probably a tandem switch rather than a destination switch.

The above-described station number portability arrangement allows a station user to retain his/her original assigned station number despite relocation from an original switch to a new switch. A common data base associates a station number with a switch. The stations can be ported from one switch to another by altering the data base to indicate the new association of a switch with a ported station number.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a communication switching network interconnecting a number of independent switching nodes where each of said switching nodes serves a plurality of subscriber stations, a method for providing station number portability for said subscriber stations when at least one of said subscriber stations is ported from one switching node to another switching node, wherein said method comprises the steps of:

dialing digits to identify a called station when a calling one of said stations makes a call connection request;

scanning a replica of a common data base replicated in each one of a plurality of said switching nodes to determine if said identified called station is included in said common data base, wherein said common data base includes a list of subscriber stations including ported subscriber stations and identifies for each listed subscriber station a switching node associated in said data base with that listed subscriber station;

specifying which one of said switching nodes is associated with said identified called station in said data base, in response to determining that said identified called station is included in said common data base;

transmitting said dialed digits associated with said identified called station to said specified one of said switching nodes; and establishing, in response to said dialed digits, said call connection between said calling one of said stations and said specified one of said switching nodes associated with said identified called station.

2. The method of claim 1 wherein said method further comprises the step of:

defining a common numbering plan format for said common data base;

identifying a numbering plan format associated with said dialed digits of said identified called station;

scanning a network numbering plan table to determine if said identified numbering plan format conforms to said defined common numbering plan format; and converting said dialed digits to said defined common numbering plan format when said identified numbering plan format does not conform to said common numbering plan format.

3. The method of claim 1 wherein said method further comprises the steps of:

entering into a portability cluster table the identities of each of said switching nodes providing station number portability.

4. The method of claim 3 wherein said method further comprises the steps of:

identifying an associated switching node of said calling one of said stations to detect inclusion of said associated switching node in said portability cluster table;

identifying said specified one of said switching nodes associated with said identified called station to detect inclusion of said specified one of said switching nodes in said portability cluster table; and implementing station number portability for said identified called station when inclusion in said portability cluster table is detected.

5. The method of claim 1 wherein said method further comprises the steps of:

selecting a route between said calling one of said stations and said specified one of said switching nodes of said identified called station;

routing said call connection over said selected route when said selected route is available; and selecting an alternate route between said calling one of said stations and said specified one of said switching nodes of said identified called station when said selected route is unavailable.

6. The method of claim 1 wherein said method further comprises the steps of:

detecting if said identified called station resides on said specified one of said switching nodes; and establishing said call connection between said calling one of said stations and said identified called station when said identified called station resides on said specified one of said switching nodes.

7. The method of claim 6 wherein said method further comprises the steps of:

detecting on which switching node said identified called station resides when it is determined that said identified called station does not reside on said specified one of said switching nodes;

scanning said common data base to detect the identity of a switching node which is currently associated with said identified called station; and routing a call connection between said specified one of said switching nodes to said currently associated switching node indicated by a common data base of said specified one of said switching nodes.

8. The method of claim 2 wherein said method further comprises the steps of:

defining a common numbering plan format for said common data base;

identifying a numbering plan format associated with said dialed digits of said identified called station when said identified called station is not included in said common data base;

scanning a second network numbering plan table to determine if said identified numbering plan format is different from said defined common numbering plan format; and converting said dialed digits to said identified numbering plan format when said defined common numbering plan format is different from said identified common numbering plan format to process a call connection to said identified called station not included in said common data base.

9. In a communication switching network interconnecting a number of independent switching nodes where each of said switching nodes serves a plurality of subscriber stations, a method for providing station number portability for said subscriber stations when one of said subsciber stations is ported from an original assigned one of said switching nodes to a new one of said switching nodes, wherein said method comprises the steps of:

generating a call connection request by dialing an original assigned number of said ported station from a calling one of said stations;

scanning, in response to said generated call connection request, a replica of a common data base replicated in each one of a plurality of said switching nodes and identifying, for each one of a plurality of subscriber stations including ported stations, a switching node associated in said data base with that subscriber station's original assigned number, to detect the association in said common data base of said dialed original assigned number with said identified switching node;

applying said original assigned number to said identified switching node; and establishing said call connection between said calling one of said stations and said ported station through said identified switching node.

10. The method of claim 9 wherein said method further includes the steps of:

defining a common numbering plan format for said common data base;

identifying a numbering plan format associated with said dialed original assigned number of said ported station;

scanning a network numbering plan table to determine if said identified numbering plan format conforms to said defined common numbering plan format; and converting said original assigned number to said defined common numbering plan format when said identified numbering plan format does not conform to said defined common numbering plan format without effectively changing said original assigned number.

11. The method of claim 9 wherein said method further includes the steps of:

selecting a route between said calling one of said stations and said ported station;

detecting whether said selected route is available;

selecting an alternate route between said calling one of said stations and said ported station when said selected route is unavailable; and routing said call connection over one of said selected routes when one of said selected route is available.

12. In a communication switching network interconnecting a number of independent switching nodes where each of said switching nodes serves a plurality of subscriber stations, a method for providing station number portability for said subscriber stations when at least one of said subscriber stations is ported from one switching node to another switching node, wherein said method comprises the steps of:

defining a common numbering plan format for a common data base that includes a list of ported subscribers' stations;

dialing digits to identify a called station when a calling one of said stations makes a call connection request;

identifying a numbering plan format assoicated with said dialed digits of said identified called station;

scanning a network numbering plan table to determine if said identified numbering plan format conforms to said defined common numbering plan format;

converting said dialed digits to said defined common numbering plan format when said identified numbering plan format does not conform to said common numbering plan format;

scanning said common data base to determine if said identified called station is included in said common data base;

specifying which one of said switching nodes is associated with said identified called station in said common data base, in response to determining that said identified called station is included in said common data base;

transmitting said dialed digits associated with said identified called station to said specified one of said switching nodes; and establishing, in response to said dialed digits, said call connection between said calling one of said stations and said specified one of said switching nodes associated with said identified called station.

13. The method of claim 12 wherein said method further comprises the steps of:

identifying a numbering plan format associated with said dialed digits of said identified called station when said identified called station is not included in said common data base;

scanning a second network numbering plan table to determine if said identified numbering plan format is different from said defined common numbering plan format; and converting said dialed digits to said identified numbering plan format when said defined common numbering plan format is different from said identified common numbering plan format to process a call connection to said identified called station not included in said common data base.

14. In a communication switching network interconnecting a number of independent switching nodes where each of said switching nodes serves a plurality of subscriber stations, a method for providing staion number portability for said subscriber stations when at least one of said subscriber stations is ported from one switching node to another switching node, wherein said method comprises the steps of:

dialing digits to identify a called station when a calling one of said stations makes a call connection request;

identifying an associated switching node of said calling one of said stations to detect inclusion of said asociated switching node in a portability cluster table containing identities of switching nodes providing station number portability;

identifying said specified one of said switching nodes associated with said identified called station to detect inclusion of said specified one of said switching nodes in said portability cluster table; and implementing station number portability for said identified called station, when inclusion of at least one of said switching nodes in said portability cluster table is detected, by the steps of scanning a common data base to determine if said identified called station is included in said common data base wherein said common data base includes a list of ported subscribers stations, specifying which one of said switching nodes is associated with said identified called station when said identified called station is included in said common data base, transmitting said dialed digits associated with said identified called station to said specified one of said switching nodes, and establishing, in response to said dialed digits, said call connection between said calling one of said stations and said specified one of said switching nodes associated with said identified called station.

15. In a communication switching network interconnecting a number of independent switching nodes where each of said switching nodes serves a plurality of subscriber stations, a method for providing station number portability for said subscriber stations when one of said subscriber stations is ported from an original assigned one of said switching nodes to a new one of said switching nodes, wherein said method comprises the steps of:

defining a common numbering plan format for a common data base;

generating a call connection request by dialing an original assigned number of said ported station from a calling one of said stations;

identifying a numbering plan format associated with said dialed original assigned number of said ported station;

scanning a network numbering plan table to determine if said identified numbering plan format conforms to said defined common numbering plan format;

converting said original assigned number to said defined common numbering plan format when said identified numbering plan format does not conform to said defined common numbering plan format without effectively changing said original assigned number;

scanning, in response to said generated call connection request, a common data base to detect an association of said original assigned number with one of said switching nodes in said communication network;

identifying a switching node currently serving said ported station;

applying said original assigned number to said identified switching node; and establishing said call connection between said calling one of said stations and said ported station residing on said identified switching node.

* * * * *